United States Patent
Hong

(10) Patent No.: US 7,604,891 B2
(45) Date of Patent: Oct. 20, 2009

(54) DIRECT OXIDATION FUEL CELL

(75) Inventor: Ming-Zi Hong, Yongin-si (KR)

(73) Assignee: Samsung SDI Co., Ltd., Suwon-si (KR)

(*) Notice: Subject to any disclaimer, the term of this patent is extended or adjusted under 35 U.S.C. 154(b) by 0 days.

(21) Appl. No.: 11/605,027

(22) Filed: Nov. 27, 2006

(65) Prior Publication Data

US 2007/0122681 A1     May 31, 2007

(30) Foreign Application Priority Data

Nov. 29, 2005    (KR) ............... 10-2005-0114772

(51) Int. Cl.
*H01M 8/02* (2006.01)
*H01M 8/10* (2006.01)
*H01M 8/24* (2006.01)

(52) U.S. Cl. .............. 429/38; 429/32; 429/39

(58) Field of Classification Search ............ 429/38, 429/32, 39
See application file for complete search history.

(56) References Cited

U.S. PATENT DOCUMENTS

| | | | |
|---|---|---|---|
| 2003/0039876 A1 | 2/2003 | Knights et al. | |
| 2003/0049510 A1* | 3/2003 | Ren | 429/30 |
| 2004/0001988 A1 | 1/2004 | Yazici et al. | |
| 2004/0121198 A1* | 6/2004 | Xie | 429/13 |
| 2005/0019639 A1 | 1/2005 | Nakakubo et al. | |
| 2005/0227140 A1* | 10/2005 | Beckmann et al. | 429/44 |
| 2007/0037029 A1* | 2/2007 | Acker et al. | 429/30 |
| 2007/0072052 A1* | 3/2007 | An et al. | 429/38 |

FOREIGN PATENT DOCUMENTS

| | | |
|---|---|---|
| CN | 1402371 A | 3/2003 |
| CN | 1178321 C | 12/2004 |
| EP | 1 274 144 A2 | 1/2003 |
| JP | 2-168565 | 6/1990 |
| JP | 02-168565 * | 6/1990 |

(Continued)

OTHER PUBLICATIONS

Patent Abstracts of Japan, Publication No. 02-168565, dated Jun. 28, 1990, in the name of Yasuyuki Sakakibara et al.

(Continued)

*Primary Examiner*—Patrick Ryan
*Assistant Examiner*—Angela J. Martin
(74) *Attorney, Agent, or Firm*—Christie, Parker & Hale, LLP

(57) ABSTRACT

A direct oxidation fuel cell is provided. A direct oxidation fuel cell includes one or more electricity generators which have a membrane-electrode assembly and anode and cathode members disposed in close contact with respective sides of the membrane-electrode assembly interposed therebetween in order to generate electrical energy and water by a reaction of a fuel and oxygen. The cathode member includes a plurality of air vents of which diameters gradually increase in a direction from a surface of the cathode member closely contacting the membrane-electrode assembly to a surface thereof contacting the atmosphere. Water discharge lines are formed at the surface contacting the atmosphere to discharge water condensed in the air vents. Absorbing members which have a hydrophilic property for absorbing water are formed at the water discharge lines.

22 Claims, 8 Drawing Sheets

FOREIGN PATENT DOCUMENTS

| | | | |
|---|---|---|---|
| JP | 7-326361 | | 12/1995 |
| JP | 10-172586 | * | 6/1998 |
| JP | 2001-093545 | * | 4/2001 |
| JP | 2001-93545 | | 4/2001 |
| WO | WO 02/41421 A1 | | 5/2002 |
| WO | WO 2004/031497 A2 | | 4/2004 |
| WO | WO 2004/038824 A2 | | 5/2004 |
| WO | WO 2004/042855 | * | 5/2004 |
| WO | WO 2004/042855 A2 | | 5/2004 |

OTHER PUBLICATIONS

Patent Abstracts of Japan, Publication No. 07-326361, dated Dec. 12, 1995, in the name of Seiji Mizuno.

Patent Abstracts of Japan, Publication No. 10-172586, dated Jun. 26, 1998, in the name of Akio Yamamoto.

Patent Abstracts of Japan, Publication No. 2001-093545, dated Apr. 6, 2001, in the name of Koji Yamada.

International Search Report dated Dec. 27, 2007 for International Application No. EP 06 12 5028.8, indicating relevance of cited references in this IDS.

* cited by examiner

DIRECT OXIDATION FUEL CELL

CROSS-REFERENCE TO RELATED APPLICATION

This application claims priority to and the benefit of Korean Patent Application No. 10-2005-0114772 filed in the Korean Intellectual Property Office on Nov. 29, 2005, the entire content of which is incorporated herein by reference.

BACKGROUND OF THE INVENTION

1. Field of the Invention

The present invention relates to a direct oxidation fuel cell.

2. Description of the Related Art

The direct oxidation fuel cell is directly supplied with a fuel in liquid phase and generates electrical energy by an electrochemical reaction of hydrogen contained in the fuel and air supplied separately.

The direct oxidation fuel cell may be of the passive type in which air is supplied at no-load independent of a pump or a blower, or an active type in which air is supplied by driving a pump or a blower.

The passive type direct oxidation fuel cell includes a membrane-electrode assembly (MEA) and anode and cathode plates disposed in close contact with respective sides of the MEA interposed therebetween.

The cathode plate includes a plurality of air vents through which air flows and is exposed to the atmosphere. The air vents have the same diameter and penetrate the cathode plate, and the diameter is of such a size that conductivity of the cathode plate can be sustained. In other words, the cathode plate is disposed in close contact with the MEA while maintaining a reference contact area such that a contact area closely contacting the MEA does not affect the conductivity.

However, the conventional passive type direct oxidation fuel cell generates water vapor through a reduction reaction of air in the MEA, and the cathode plate is exposed to the atmosphere, so that the water vapor contacts the atmosphere of a relatively low temperature and is condensed into water in the air vents of the cathode plate. The condensed water is collected in the air vents of the cathode plate, so that the condensed water blocks the air vents by operation of surface tension.

Accordingly, in the conventional direct oxidation fuel cell, the air vents of the cathode plate are blocked by the condensed water so as not to be properly supplied with air in the atmosphere. Therefore, efficiency and reliability of the entire fuel cell decreases.

In order to solve the aforementioned problem, the conventional direct oxidation fuel cell is constructed such that diameters of the entire air vents of the cathode plate increase. In this case, the contact area of the cathode plate with respect to the MEA becomes smaller than the reference contact area, so that electrons cannot properly move to the cathode plate.

Consequently, in the conventional direct oxidation fuel cell, the potential difference that occurs when electrons move decreases. Accordingly, the output efficiency of electrical energy decreases.

SUMMARY OF THE INVENTION

In accordance with embodiments of the present invention a direct oxidation fuel cell is provided in which conductivity of a cathode plate can be sustained and water condensed in air vents of the cathode plate can be easily discharged.

According to an aspect of the present invention, a direct oxidation fuel cell is provided that includes one or more electricity generators which have an MEA and anode and cathode members disposed in close contact with respective sides of the MEA interposed therebetween to generate electrical energy and water by a reaction of a fuel and oxygen. The cathode member includes a plurality of air vents through which air flows. Water discharge lines are connected to the air vents in order to discharge water condensed in the air vents. Absorbing members which have a hydrophilic property for absorbing water are formed at the water discharge lines.

A contact area of a surface of the cathode member contacting the atmosphere may be the same as a contact area of a surface of the cathode member closely contacting the MEA.

The water discharge lines may be formed as grooves in the gravity direction at a surface of the cathode member contacting the atmosphere.

The water discharge lines may include branch lines connected to the air vents and joining lines connected to the branch lines.

The absorbing members may fill the water discharge lines.

The absorbing members may be coated on the water discharge lines.

The absorbing members may be made of a hydrophilic resin, such as polyether, polyalcohol, polyamide, polysulfonic acid, polycarboxylic acid, and cellulose.

The anode member may include a flowpath through which the fuel flows. The flowpath may be formed in a meandering shape.

The anode and cathode members may be constructed as current collectors for collecting currents having the opposite polarity to each other.

According to another aspect of the present invention, the cathode member may include a plurality of air vents of which diameters gradually increase in a direction from a surface of the cathode member closely contacting the MEA to a surface thereof contacting the atmosphere. Water discharge lines are also formed at the surface contacting the atmosphere to discharge water condensed in the air vents. Absorbing members which have a hydrophilic property for absorbing water are also formed at the water discharge lines.

A contact area of the surface of the cathode member closely contacting the MEA may be larger than a contact area of the surface of the cathode member contacting the atmosphere.

Each of the air vents may include a first portion which has a predetermined diameter and is formed at the surface closely contacting the MEA, and a second portion which is extended from the first portion and of which diameter gradually increases in a direction toward the surface of the cathode member contacting the atmosphere.

The air vents may be formed in a tapered shape.

The water discharge lines may be formed as grooves which connect the second portions with others of the second portions.

The water discharge lines may include branch lines connected to the second portions and joining lines connected to the branch lines.

DETAILED DESCRIPTION

Figure 1:
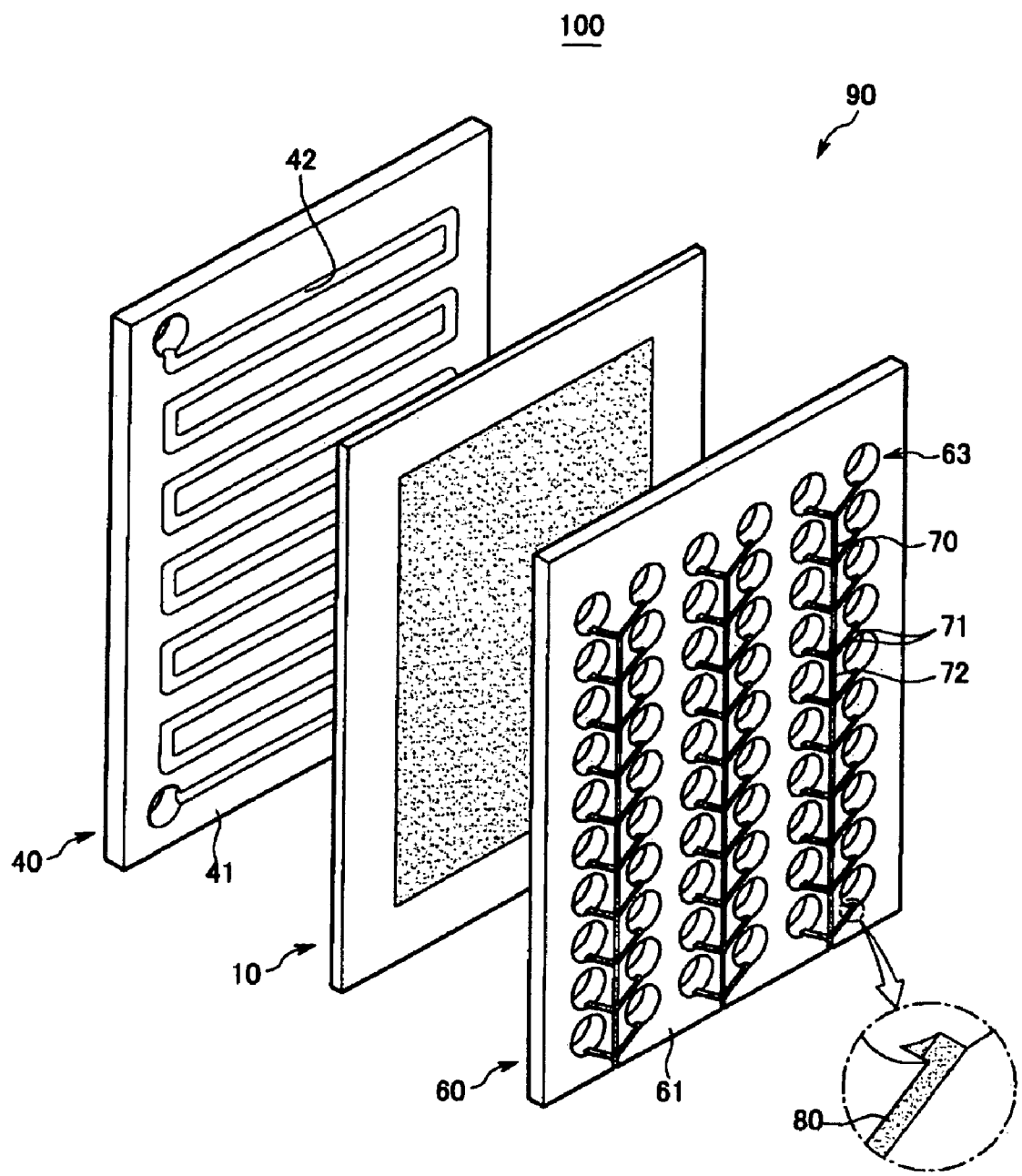
FIG. 1 is an exploded perspective view showing a structure of a direct oxidation fuel cell according to a first embodiment of the present invention.
Figure 2:
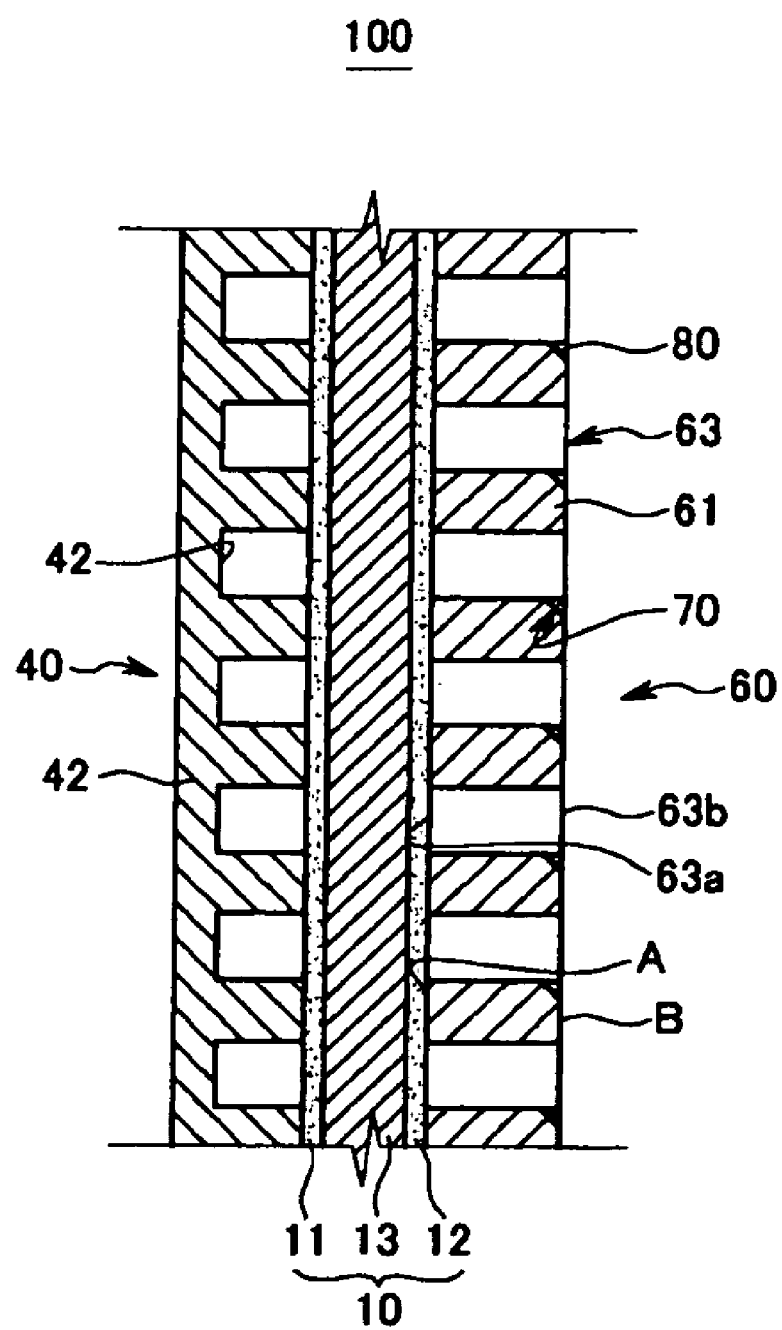
FIG. 2 is a cross sectional view showing an assembled structure of FIG. 1.

Referring to FIGS. 1 and 2, a direct oxidation fuel cell 100 is an electricity generating system for generating electrical energy by an electrochemical reaction of a fuel and oxygen and outputting the electrical energy to a predetermined electronic device.

The direct oxidation fuel cell 100 may be a direct methanol fuel cell (DMFC) of a conventional passive type in which an alcohol-based fuel such as methanol and ethanol and air in the atmosphere are directly supplied to generate electrical energy by an oxidation reaction of hydrogen contained in the fuel and a reduction reaction of oxygen contained in the air.

More specifically, the direct oxidation fuel cell 100 according to the present embodiment includes one or more electricity generating units 90 which are supplied with a fuel by a fuel supply device (not shown) or by a capillary action of a fuel or a density difference and air in the atmosphere by diffusion and convection, and generate electrical energy by oxidation and reduction reactions of the fuel and the air, respectively.

The direct oxidation fuel cell 100 according to the embodiment may be a plate type fuel cell in which the electricity generating units 90 are disposed in a plane. In the figure, the fuel cell 100 according to the embodiment has a single electricity generating unit 90. This is because the figure is simplified for the convenience of description. Alternatively, a plurality of the electricity generating units 90 may be sequentially disposed to constitute the fuel cell 100 according to the present embodiment.

The electricity generating unit 90 of the direct oxidation fuel cell 100 as described above basically includes an MEA 10 and anode and cathode members 40 and 60 disposed in close contact with respective sides of the MEA 10 interposed therebetween.

Referring to FIG. 2, a first electrode layer 11 is formed at the one side of the MEA 10, a second electrode layer 12 is formed at the other side thereof, and a membrane 13 is formed between the two electrode layers 11, 12. The anode member 40 is disposed in close contact with the first electrode layer 11, and the cathode member 60 is disposed in close contact with the second electrode layer 12.

The first electrode layer 11 is supplied with a fuel through the anode portion 40. In addition, in the first electrode layer 11, hydrogen contained in the fuel is decomposed into electrons and hydrogen ions by an oxidation reaction. In the membrane 13, the hydrogen ions decomposed from the hydrogen in the first electrode layer 11 move to the second electrode layer 12. In the second electrode layer 12, the electrons and the hydrogen ions received from the first electrode layer 11 are reacted with oxygen supplied through the cathode member 60 to generate water and heat.

In the embodiment, the anode member 40 is made of a conductive metal in a shape of a plate to be closely contacted with the first electrode layer 11 of the MEA 10. In the anode member 40, the fuel is distributed to be supplied to the first electrode layer 11 of the MEA 10. In addition, the anode member 40 serves as a conductor such that the electrons decomposed from the hydrogen in the first electrode layer 11 move to the cathode member 60 that will be further described later.

The anode member 40 is provided with a flowpath 42 through which the fuel flows to the first electrode layer 11. The flowpath 42 is formed at a surface corresponding to the first electrode layer 11 of the MEA 10 in a shape of a channel. The flowpath 42 is formed in generally straight lines at predetermined intervals at the one area of the anode portion 40 facing the first electrode layer 11 of the MEA 10, and both ends of the lines are connected in alternate position, so that the flowpath 42 is formed in a meandering shape.

In addition, as described above, the anode member 40 serves as a conductor in which electrons move to the cathode member 60. Therefore, the anode member 40 may be constructed as a current collector 41 for collecting currents having the opposite polarity to that of the cathode portion 60.

In the present embodiment, the cathode member 60 is exposed to the atmosphere and is made of a conductive metal in a shape of a plate to be closely contacted with the second electrode layer 12 of the MEA 10. Air in the atmosphere is distributed to be supplied to the second electrode layer 12 of the MEA 10 through the cathode member 60 by diffusion and convection. In addition, the cathode member 60 serves as a conductor so as to receive electrons from the anode member 40.

In order to supply the air in the atmosphere to the second electrode layer 12 of the MEA 10, the cathode member 60 is provided with a plurality of air vents 63 penetrating the plate of the cathode member 60 at a side corresponding to the second electrode layer 12 of the MEA 10.

In this case, similar to the conventional case, a plurality of the air vents 63 have the same diameter and are formed in a direction from a surface (A) (hereinafter, denoted by a "first surface" for the convenience) of the cathode member 60 closely contacting the MEA 10 to a surface (B) (hereinafter, denoted by a "second surface" for the convenience) contacting the atmosphere. That is, the cathode member 60 is constructed in which a contact area of the first surface (A) contacting the second electrode layer 12 of the MEA is the same as a contact area of the second surface (B) contacting the atmosphere.

More specifically, each air vent 63 has a first opening portion 63a having a predetermined diameter at the first surface (A) of the cathode member 60 and a second opening portion 63b having the same diameter as that of the first opening portion 63a at the second surface (B) of the cathode member 60, and the first and second opening portions 63a, 63b are connected with each other.

In addition, the cathode member 60 serves as a conductor for receiving electrons from the anode member 40 as described above, so that the cathode member 60 may be constructed as a current collector 61 for collecting currents having the opposite polarity to that of the anode member 40.

When the direct oxidation fuel cell 100 according to the present embodiment having the aforementioned construction operates, water vapor is generated by a reduction reaction of oxygen in the second electrode layer 12 of the MEA 10. Since the cathode member 60 is exposed to the atmosphere, the water vapor contacts the atmosphere of a relatively low temperature and is condensed into water in the air vents 63 of the cathode member 60.

The condensed water is collected in the air vents 63 of the cathode member 60, and the condensed water blocks the air vents by operation of surface tension. In this case, air in the atmosphere cannot be sufficiently supplied to the second electrode layer 12 of the MEA 10 through the air vents.

In order to easily discharge the condensed water in the air vents 63, the direct oxidation fuel cell 100 according to the present embodiment includes water discharge lines 70 connected to the air vents 63 with each other and absorbing members 80 formed at the water discharge lines 70.

Figure 3:
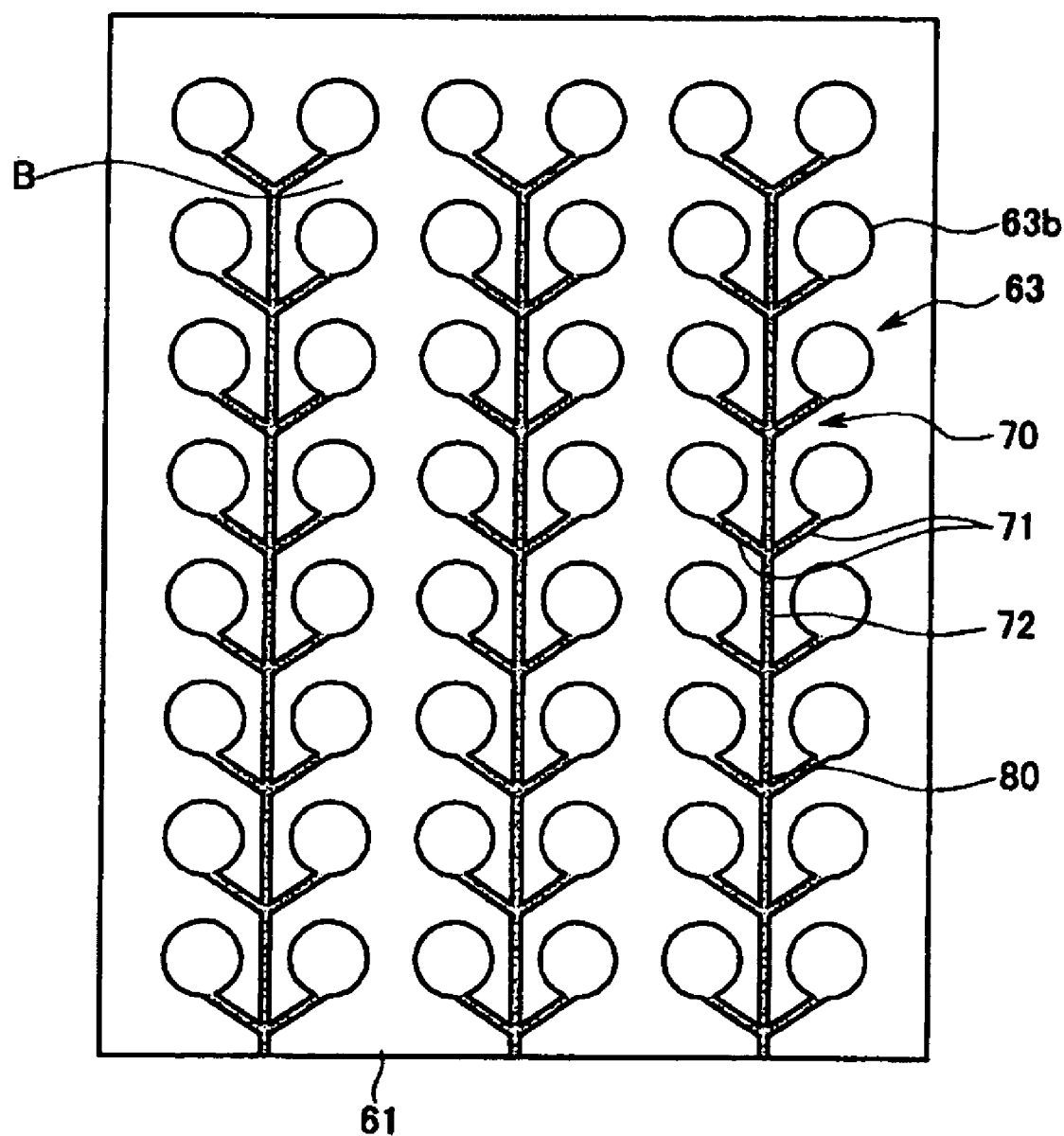
FIG. 3 is a plan view showing a cathode member shown in FIG. 1.

In the present embodiment, as shown in FIGS. 1 and 3, the water discharge lines 70 are formed as grooves which connect the second opening portions 63b of the air vents with each other at the second surface (B) of the cathode member 60 and are formed in the gravity direction on the basis that the cathode member 60 stands erect.

The water discharge lines 70 include branch lines 71 which branch off from the second opening portions 63b of the air vents 63 and are formed to be inclined downwardly, and joining lines 72 which are formed in the vertical direction (the gravity direction) of the cathode member 60 and are connected with the branch lines 71.

Therefore, due to the first opening portions 63a of the air vents 63, the cathode member 60 has a contact area in the first surface (A) similar to that of the conventional cathode member, and the first surface (A) is disposed in close contact with the second electrode layer 12 of the MEA 10. In addition, the cathode member 60 includes the water discharge lines 70 which connect the second opening portions 63b of the air vents 63 with each other at the second surface (B). Therefore, conductivity for connecting the first and second electrode layers 11, 12 in series can be sustained, and the condensed water in the air vents 63 can be easily discharged outside the air vents 63 through the water discharge lines 70.

In the present embodiment, the absorbing members 80 are used to easily discharge the condensed water in the air vents 63 through the water discharge lines 70. The absorbing members 70 serve as wicks for absorbing and storing the water in the water discharge lines 70.

Figure 4A:
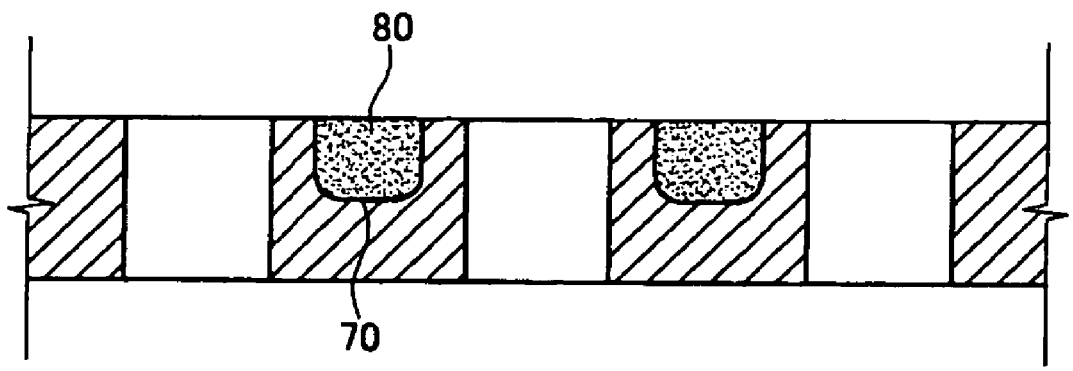
FIGS. 4A and 4B are cross sectional views showing absorbing members shown in FIG. 1.
Figure 4B:
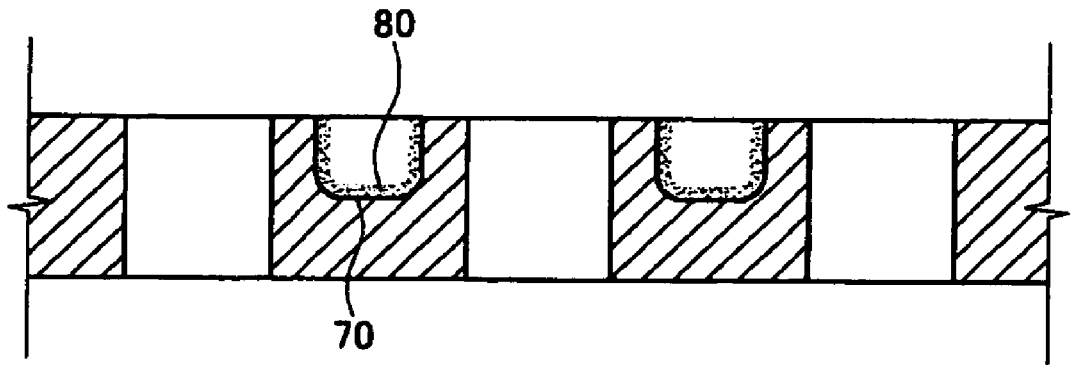

The absorbing members 80 may fill the grooved areas of the water discharge lines 70 as shown in FIG. 4A to fill up the water discharge lines 70. Alternatively, the absorbing members 80 may be coated on the grooved areas of the water discharge lines 70 in a film type as shown in FIG. 4B.

The absorbing members 80 may be made of a conventional hydrophilic resin for easily absorbing and storing water such as polyether, polyalcohol, polyamide, polysulfonic acid, polycarboxylic acid, cellulose, or the like. Alternatively, the absorbing members 80 may be made of a conventional porous carbon material, conventional zeolite for easily absorbing water, or phosphorus oxide ($P_2O_5$).

Therefore, in the embodiment, the absorbing members 80 are formed at the water discharge lines 70 which connect the air vents 63 with each other, and the absorbing members 80 absorb the condensed water in the air vents 63, so that the condensed water can be easily discharged through the water discharge lines 70. In addition, in the embodiment, since the absorbing members 80 absorb the condensed water in the air vents 63, the water can be easily discharged through the water discharge lines 70 regardless of a direction of the fuel cell 100 even though the fuel cell 100 rotates.

Operation of the direct oxidation fuel cell 100 having the aforementioned construction according to the embodiment will now be described in more detail.

First, a fuel flows along the flow path 42 of the anode member 40 and is supplied to the first electrode layer 11 of the MEA 10. Thereafter, in the first electrode layer 11 of the MEA 10, hydrogen contained in the fuel is decomposed into electrons and hydrogen ions (protons) by an oxidation reaction of the fuel. The hydrogen ions move to the second electrode layer 12 through the membrane 13 of the MEA 10, and the electrons are unable to pass the membrane 13 and move to the cathode member 60 through the anode member 40.

By means of the aforementioned operation, the direct oxidation fuel cell 100 according to the present embodiment generates currents by movements of the electrons, and the anode and cathode members 40, 60 are constructed as the current collectors 41, 61 for collecting currents, thereby outputting electrical energy having a predetermined potential difference.

At the same time, air in the atmosphere flows through the air vents 63 of the cathode member 60 by diffusion and convection and is supplied to the second electrode layer 12 of the MEA 10. Thereafter, in the second electrode layer 12 of the MEA 10, hydrogen ions passing through the membrane 13, electrons passing through the anode member 40, and the air supplied through the air vents 63 are reacted to generate heat and water.

The water is condensed in the air vents 63 of the cathode member 60. Since the water discharge lines 70 which connect the second opening portions 63b of the air vents 63 and the absorbing members 80 formed at the water discharge lines 70 are provided to the second surface (B) of the cathode member 60, the absorbing members 80 absorb and store the condensed water to discharge the water into an additional collecting means (not shown) through the water discharge lines 70.

Accordingly, the direct oxidation fuel cell 100 according to the present embodiment can prevents the air vents 63 of the cathode member 60 from being blocked by the water. Therefore, air in the atmosphere can be properly supplied to the second electrode layer 12 of the MEA 10 through the air vents 63 of the cathode member 60.

Particularly, in the present embodiment, due to the first opening portions 63a of the air vents 63, the cathode member 60 has the contact area in the first surface (A) similar to that of the conventional cathode member. In addition, the first surface (A) is disposed in close contact with the second electrode layer 12 of the MEA 10. Therefore, conductivity for connecting the first and second electrode layers 11, 12 in series can be sustained, and water condensed in the air vents 63 can be easily discharged by the aforementioned operations. In addition, in the embodiment, since the absorbing members 80 absorb the condensed water in the air vents 63, the water can be easily discharged through the water discharge lines 70 regardless of a direction of the fuel cell 100 even though the fuel cell 100 rotates.

Figure 5:
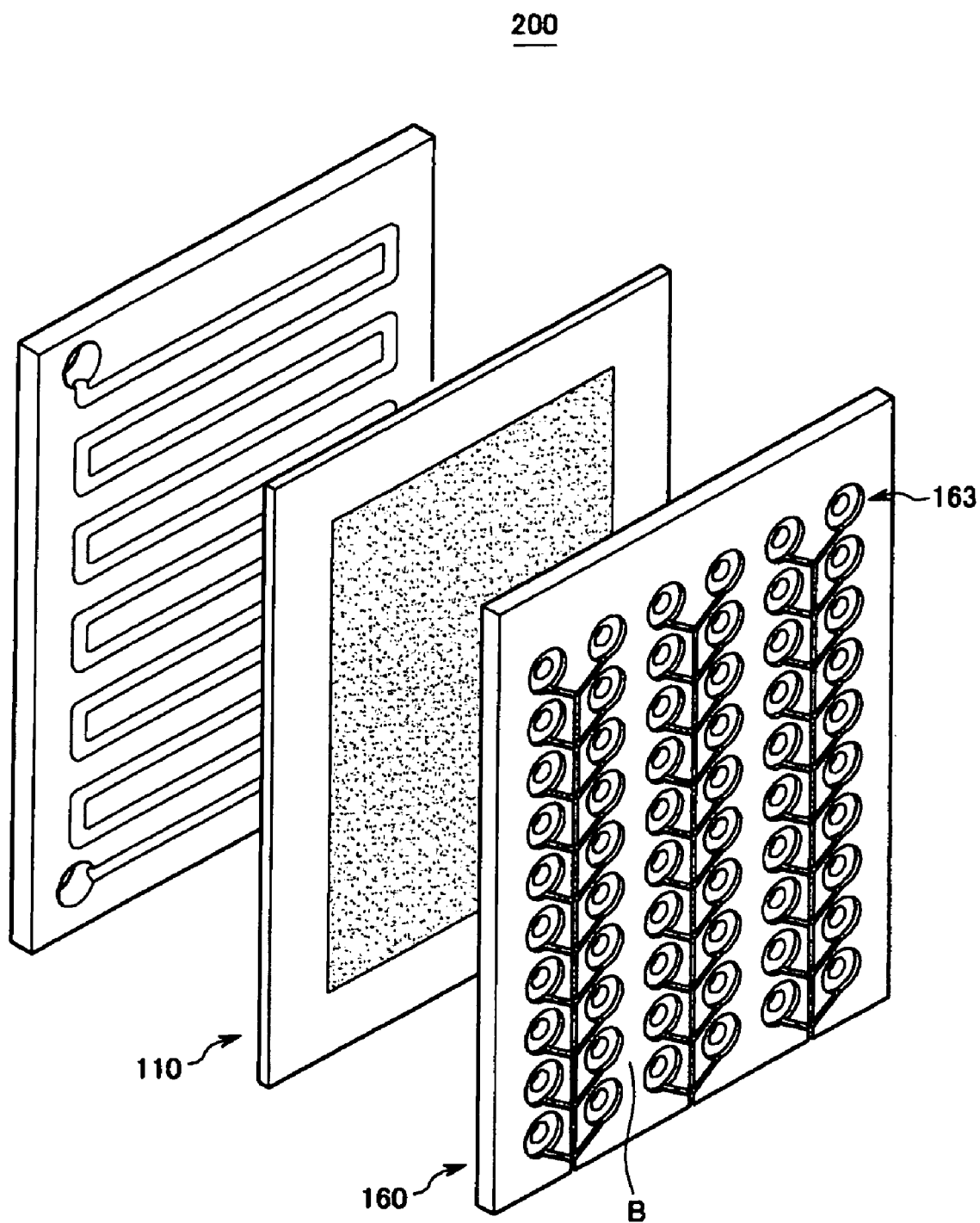
FIG. 5 is an exploded perspective view showing a structure of a direct oxidation fuel cell according to a second embodiment of the present invention.
Figure 6:
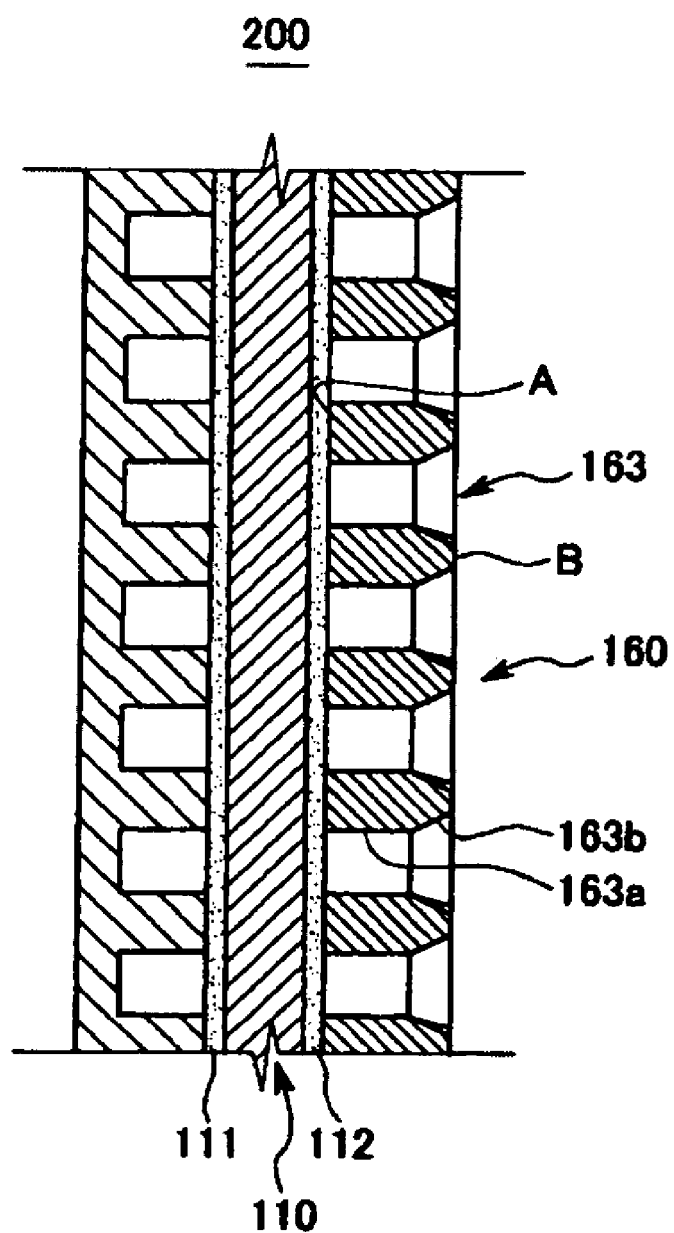
FIG. 6 is a cross sectional view showing an assembled structure of FIG. 5.

FIG. 5 is an exploded perspective view showing a structure of a direct oxidation fuel cell according to a second embodiment of the present invention. FIG. 6 is a cross sectional view showing an assembled structure of FIG. 5.

Referring to FIGS. 5 and 6, a direct oxidation fuel cell 200 according to a second embodiment has basically the same structure as that in the aforementioned embodiment. Particularly, in the second embodiment, a cathode member 160 is constructed in which diameters of air vents 163 increase in a direction from a first surface (A) to a second surface (B). Therefore, surface tension of condensed water like water drops at the air vents 163 decreases, so that the water can be easily discharged.

In the present embodiment, each air vent 163 includes a first portion 163a formed at the first surface (A) with a predetermined diameter and a second portion 163b which is extended from the first portion 163a and of which diameter increases in a direction toward the second surface (B) of the cathode member 160. That is, the cathode member 160 is constructed in which a contact area of a surface (A) closely contacting the second electrode layer 112 of the MEA 110 is larger than a contact area of a surface (B) contacting the atmosphere.

More specifically, in the cathode member 160, the first portion 163a of the air vent 163 has an opening portion having a predetermined diameter formed at the first surface (A) of the cathode member 160, and is formed to a predetermined depth with the same diameter toward the second surface (B). On the other hand, the second portion 163b is extended from the first portion 163a, has a diameter that gradually increases in a direction toward the second surface (B) of the cathode member 160, and forms an opening portion having a larger diameter than the first portion 163a at the second surface (B) of the cathode member 160.

Therefore, since the diameter of the second portion 163b of the air vent 163 in the cathode member 160 gradually increases in a direction from the first portion 163a to the second surface (B), the surface tension of water condensed at the second portion 163b decreases, and the water can be easily discharged outside the air vents 163. In addition, due to the first portions 163a of the air vents 163, the cathode member 160 has the contact area in the first surface (A) similar to that of the conventional cathode member, and the first surface (A) is disposed in close contact with the second electrode layer 112 of the MEA 110. Therefore, conductivity for connecting the first and second electrode layers 111, 112 in series can be sustained, and water condensed in the air vents 163 can be easily discharged.

Figure 7:
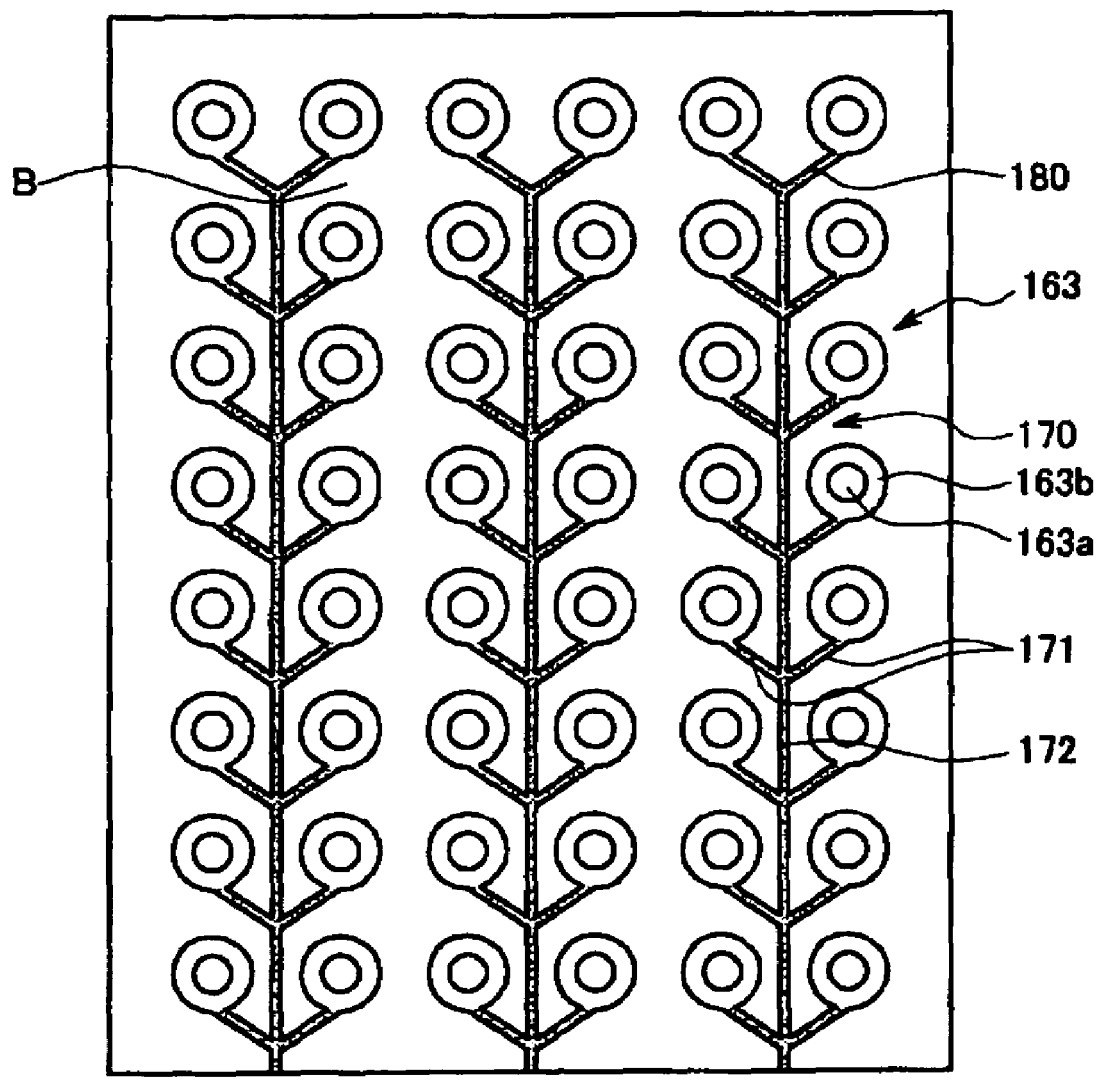
FIG. 7 is a plan view showing a cathode member shown in FIG. 5.

The cathode member 160 of the fuel cell 200 is provided with water discharge lines 170 similar to those in the aforementioned embodiment as shown in FIG. 7. The water discharge lines 170 are formed as grooves which connect the second portions 163b of the air vents 163 with each other at the second surface (B) of the cathode member 160. The water discharge lines 170 include branch lines 171 which branch off from the second opening portions 163b of the air vents 163 and are formed to be inclined downwardly, and joining lines 172 which are formed in the vertical direction (the gravity direction) of the cathode member 160 and are connected with the branch lines 171.

In addition, in the present embodiment, absorbing members 180 formed at the water discharge lines 170 as described above in the aforementioned embodiment are provided. The absorbing members 180 may fill the grooved areas of the water discharge lines 170 or may be coated on the grooved areas of the water discharge lines 170 in a film type (see FIG. 7).

Therefore, in the embodiment, since the second surface (B) of the cathode member 160 includes the water discharge lines 170 which connect the second portions 163b of the air vents 163 with each other and the absorbing members 180 formed at the water discharge lines 170, the absorbing members 180 absorb and store the water condensed in the air vents 163 to discharge the water into an additional collecting means (not shown) through the water discharge lines 170.

Figure 8:
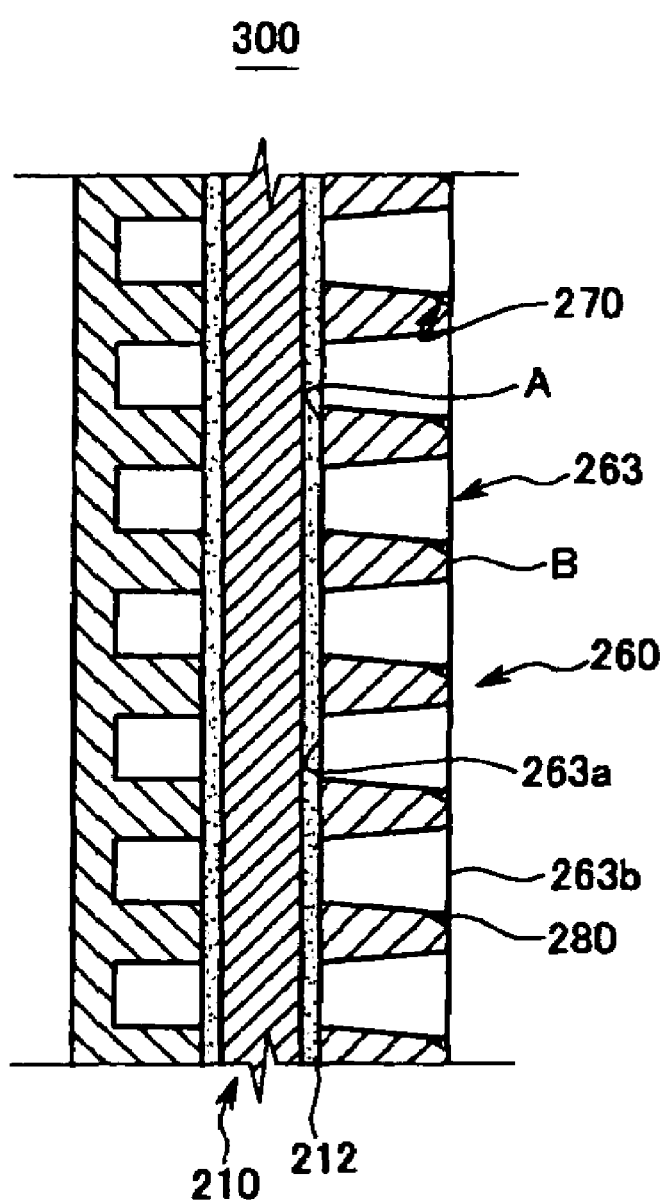
FIG. 8 is a cross sectional view schematically showing a structure of a direct oxidation fuel cell according to a third embodiment of the present invention.

FIG. 8 is a cross sectional view schematically showing a structure of a direct oxidation fuel cell according to a third embodiment of the present invention.

Referring to FIG. 8, a direct oxidation fuel cell 300 according to the embodiment includes a cathode member 260 in which air vents 263 are formed in a tapered shape so that diameters of the air vents 263 increase in a direction from a first surface (A) to a second surface (B).

More specifically, each air vent 263 of the cathode member 260 is provided with a first opening portion 263a having a predetermined diameter at the first surface (A) and a second opening portion 263b having a relatively larger diameter than that of the first opening portion 263a at the second area (B). The first and second opening portions 263a, 263b are connected so as to be formed in a tapered shape.

Therefore, due to the first opening portions 263a of the air vents 263, the cathode member 260 according to the embodiment has a contact area in the first surface (A) similar to that of the conventional cathode member, and the first surface (A) is disposed in close contact with the second electrode layer 212 of the MEA 210. Since the air vent 263 of the cathode member 260 is formed in a tapered shape in which the diameter of the air vent 263 gradually increases in a direction from the first surface (A) to the second surface (B), the surface tension of water condensed at the second opening portion 263b decreases, and the water can be easily discharged outside the air vents 263.

In addition, the direct oxidation fuel cell 300 according to the embodiment includes water discharge lines 270 which are formed as grooves at the second surface (B) of the cathode member 260 and connect the second opening portions 263b of the air vents 263, and absorbing members 280 formed at the water discharge lines 270. Components and operation of the water discharge lines 270 and the absorbing members 280 are same as those in the aforementioned embodiment, a detailed description thereof is omitted.

Pursuant to the direct oxidation fuel cell according to the embodiments of the present invention, the cathode member maintains the contact area so that conductivity can be sustained and is disposed in close contact with the MEA. In addition, the cathode member is constructed in which water condensed in the air vents can be easily discharged. Therefore, output efficiency of electrical energy is maintained, and the air vents of the cathode member can be prevented from being blocked by the water.

Accordingly, air in the atmosphere can be properly supplied to the MEA through the air vents of the cathode member, efficiency and reliability of the entire fuel cell greatly increase.

Although the exemplary embodiments and the modified examples of the present invention have been described, the present invention is not limited to the embodiments and examples, but may be modified in various forms without departing from the scope of the appended claims, the detailed description, and the accompanying drawings of the present invention. Therefore, such modifications belong to the scope of the present invention.

What is claimed is:

1. A direct oxidation fuel cell comprising one or more electricity generators, each of the electricity generators having a membrane-electrode assembly and an anode member and a cathode member in close contact with respective sides of the membrane-electrode assembly, the membrane-electrode assembly being between the anode member and the cathode member to generate electrical energy and water by a reaction of a fuel and oxygen, wherein the cathode member comprises a plurality of air vents through which air flows between the membrane-electrode assembly and the atmosphere, water discharge lines formed at a surface of the cathode member contacting the atmosphere and connected to the air vents for discharging water condensed in the air vents to the atmosphere, and absorbing members at the water discharge lines for absorbing the water, and wherein a same one of the water discharge lines extends between and is coupled to two parallel columns of the air vents.

2. The direct oxidation fuel cell of claim 1, wherein a contact area of a surface of the cathode member contacting the atmosphere is substantially the same as a contact area of a surface of the cathode member closely contacting the membrane-electrode assembly.

3. The direct oxidation fuel cell of claim 1, wherein the water discharge lines are as grooves in a gravity direction at a surface of the cathode member contacting the atmosphere.

4. The direct oxidation fuel cell of claim 1, wherein the water discharge lines comprise branch lines connected to the air vents and joining lines connected to the branch lines.

5. The direct oxidation fuel cell of claim 3, wherein the absorbing members fill the water discharge lines.

6. The direct oxidation fuel cell of claim 3, wherein the absorbing members are coated on the water discharge lines.

7. The direct oxidation fuel cell of claim 1, wherein the absorbing members are made of a hydrophilic resin.

8. The direct oxidation fuel cell of claim 7, wherein the hydrophilic resin is selected from the group consisting of polyether, polyalcohol, polyamide, polysulfonic acid, polycarboxylic acid, and cellulose.

9. The direct oxidation fuel cell of claim 1, wherein the anode member includes a flowpath through which the fuel flows.

10. The direct oxidation fuel cell of claim 9, wherein the flowpath is a meandering flowpath.

11. The direct oxidation fuel cell of claim 1, wherein the anode member and the cathode member are configured as current collectors for collecting currents having the opposite polarity to each other.

12. A direct oxidation fuel cell comprising one or more electricity generators, each of the electricity generators having an membrane-electrode assembly and an anode member and a cathode member in close contact with respective sides of the membrane-electrode assembly, the membrane-electrode assembly being between the anode member and the cathode member for generating electrical energy and water by a reaction of a fuel and oxygen, wherein the cathode member comprises a plurality of air vents having diameters gradually increasing in a direction from a surface of the cathode member closely contacting the membrane-electrode assembly to a surface of the cathode member contacting the atmosphere, water discharge lines at the surface of the cathode member contacting the atmosphere to discharge water condensed in the air vents, and absorbing members having a hydrophilic property for absorbing water and being at the water discharge lines, and wherein a same one of the water discharge lines extends between and is coupled to two parallel columns of the air vents.

13. The direct oxidation fuel cell of claim 12, wherein a contact area of the surface of the cathode member closely contacting the membrane-electrode assembly is larger than a contact area of the surface of the cathode member contacting the atmosphere.

14. The direct oxidation fuel cell of claim 12, wherein each of the air vents comprises a first portion having a first portion diameter and being at the surface closely contacting the membrane-electrode assembly, and a second portion extending from the first portion and having a second portion diameter gradually increasing in a direction toward the surface of the cathode member contacting the atmosphere.

15. The direct oxidation fuel cell of claim 12, wherein the air vents are tapered.

16. The direct oxidation fuel cell of claim 12, wherein the water discharge lines are grooves connecting the air vents with others of the air vents.

17. The direct oxidation fuel cell of claim 14, wherein the water discharge lines are grooves connecting the second portions with others of the second portions.

18. The direct oxidation fuel cell of claim 12, wherein the water discharge lines comprise branch lines connected to the air vents and joining lines connected to the branch lines.

19. The direct oxidation fuel cell of claim 14, wherein the water discharge lines comprise branch lines connected to the second portions and joining lines connected to the branch lines.

20. The direct oxidation fuel cell of claim 16, wherein the absorbing members fill the water discharge lines.

21. The direct oxidation fuel cell of claim 16, wherein the absorbing members are coated on the water discharge lines.

22. The direct oxidation fuel cell of claim 12, wherein the absorbing members are made of a hydrophilic resin.

* * * * *

UNITED STATES PATENT AND TRADEMARK OFFICE
CERTIFICATE OF CORRECTION

PATENT NO. : 7,604,891 B2
APPLICATION NO. : 11/605027
DATED : October 20, 2009
INVENTOR(S) : Ming-Zi Hong It is certified that error appears in the above-identified patent and that said Letters Patent is hereby corrected as shown below:

Column 9, Claim 12, line 31          Delete "an" Insert -- a --

Signed and Sealed this
Tenth Day of May, 2011

David J. Kappos
*Director of the United States Patent and Trademark Office*